(12) United States Patent
Hsiao et al.

(10) Patent No.: US 6,328,859 B1
(45) Date of Patent: Dec. 11, 2001

(54) METHOD OF MAKING SECOND POLE TIP OF A WRITE HEAD WITH A NARROW TRACK WIDTH

(75) Inventors: Richard Hsiao; Cherngye Hwang; Hugo Alberto Emilio Santini, all of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/368,068

(22) Filed: Aug. 3, 1999

Related U.S. Application Data

(62) Division of application No. 08/924,395, filed on Sep. 5, 1997, now Pat. No. 6,031,695.

(51) Int. Cl.[7] ....................................................... C23F 1/00
(52) U.S. Cl. ............................. 204/192.34; 204/192.33
(58) Field of Search ........................ 204/192.3, 192.34, 204/192.33, 192.2; 29/603.07, 603.13, 603.14, 603.15; 216/22, 66; 360/126

(56) References Cited

U.S. PATENT DOCUMENTS

| | | | |
|---|---|---|---|
| 4,295,173 | 10/1981 | Romankiw et al. | 360/125 |
| 4,872,079 | 10/1989 | Roberts | 360/126 |
| 4,896,235 | 1/1990 | Takino et al. | 360/113 |
| 4,912,584 | 3/1990 | Mallary et al. | 360/126 |
| 4,935,832 | 6/1990 | Das et al. | 360/112 |
| 4,992,901 | * 2/1991 | Keel et al. | 29/603.15 |
| 5,075,280 | 12/1991 | Pisharody et al. | 305/1 |
| 5,134,534 | 7/1992 | Sasaki | 360/126 |
| 5,267,112 | 11/1993 | Batra et al. | 360/119 |
| 5,285,340 | 2/1994 | Ju et al. | 360/119 |
| 5,379,172 | 1/1995 | Liao | 360/126 |
| 5,404,635 | 4/1995 | Das | 29/603 |
| 5,435,053 | 7/1995 | Krounbi et al. | 29/603 |
| 5,436,781 | 7/1995 | Matono et al. | 360/126 |
| 5,438,747 | 8/1995 | Krounbi et al. | 29/603 |
| 5,452,164 | 9/1995 | Cole et al. | 360/113 |
| 5,488,528 | 1/1996 | Chen et al. | 360/126 |
| 5,559,654 | 9/1996 | Das | 360/126 |
| 5,657,186 | 8/1997 | Kudo et al. | 360/104 |
| 5,670,253 | 9/1997 | Chiu et al. | 428/336 |
| 5,696,652 | 12/1997 | Satoh | 360/104 |
| 5,703,740 | 12/1997 | Cohen et al. | 360/126 |
| 5,763,108 | 6/1998 | Chang et al. | 428/694 |
| 5,822,153 | 10/1998 | Lairson et al. | 360/104 |

\* cited by examiner

*Primary Examiner*—Nam Nguyen
*Assistant Examiner*—Gregg Cantelmo
(74) *Attorney, Agent, or Firm*—Altera Law Group, LLC

(57) ABSTRACT

A method is provided for forming a final second pole tip of a write head wherein the final second pole tip is bounded in part by a final top and final first and second side walls, the final first and second side walls being separated by a final track width at an air bearing surface (ABS). The method includes the steps of forming a preliminary second pole tip that is bounded in part by the final top and preliminary first and second side walls. The preliminary first and second side walls are separated by a preliminary width at the ABS that is wider than the final track width. Next, a non-magnetic sacrificial layer is formed on the final top of the preliminary second pole tip. Ion beam milling is then employed for milling the preliminary first and second side walls to form the final second pole tip with the final first and second side walls separated by the final track width with at least a portion of the sacrificial layer remaining on the final top of the final second pole tip.

17 Claims, 7 Drawing Sheets

METHOD OF MAKING SECOND POLE TIP OF A WRITE HEAD WITH A NARROW TRACK WIDTH

CROSS REFERENCE TO RELATED APPLICATION

This application is a divisional application of application Ser. No. 08/924,395 filed Sep. 5, 1997 now U.S. Pat. No. 6,031,695 issued Feb. 29, 2000.

BACKGROUND OF THE INVENTION

1. Field of the Invention

The present invention relates to a method of making a second pole tip of a write head with a narrow track width and more particularly to a method of trimming an oversized second pole tip to a desired track width while maintaining a desired height thereof.

2. Description of the Related Art

A write head is typically combined with a magnetoresistive (MR) read head to form a merged MR head. The merged MR head has thin film layers that have edges exposed at an air bearing surface (ABS) for writing and receiving magnetic fields on a magnetic medium, such as a disk or tape drive. The write head comprises first and second pole pieces connected at a back gap which is recessed from the ABS. The first and second pole pieces have first and second pole tips, respectively, which terminate at the ABS. An insulation stack, which comprises a plurality of insulation layers, is sandwiched between the first and second pole pieces and a coil layer is embedded in the insulation stack. A processing circuit is connected to the coil layer for providing a write current that is conducted through the coil layer which, in turn, induces write fields in the first and second pole pieces. A non-magnetic gap layer is sandwiched between the first and second pole tips so that flux fringes across the gap layer at the ABS. In a magnetic disk drive, a magnetic disk is rotated adjacent to and a short distance from the ABS so that the flux magnetizes the disk along circular tracks. The written circular tracks then contain magnetized segments with fields detectable by a read head.

An MR read head includes an MR sensor sandwiched between first and second non-magnetic gap layers and having an edge located at the ABS. The first and second gap layers and the MR sensor are sandwiched between first and second shield layers. In a merged MR head the second shield layer and the first pole piece are a common layer. The MR sensor detects magnetic fields from the circular tracks of the rotating disk by a change in resistance which corresponds to the strength of the fields. A sense current conducted through the MR sensor results in voltage changes that are detected by the processing circuitry as readback signals.

One or more merged MR heads may be employed in a magnetic disk drive for reading and writing information on circular tracks of a rotating disk. A merged MR head is mounted on a slider carried on a suspension. The suspension is mounted to an actuator which rotates the magnetic head to locations corresponding to desired tracks. As the disk rotates an air cushion is generated between the rotating disk and an air bearing surface (ABS) of the slider. A force of the air cushion against the air bearing surface is opposed by an opposite loading force of the suspension, causing the magnetic head to be suspended a slight distance (flying height) from the surface of the disk. Flying heights are typically on the order of about .05 $\mu$m.

Areal or bit density of a write head indicates the number of bits that can be written to a square inch of magnetic media, such as a magnetic tape or magnetic disk. Areal density is a product of linear density and track density of the write head. Linear density is the number of field transitions that can be written per linear inch along a track, while track density is the number of tracks that can be written per inch of track width. Linear density depends upon the distance between the first and second pole tips of the write head at the ABS. This distance (the "gap length") is equal to the thickness of the write gap layer at the ABS. "Track width" is a measure of the width of the second pole tip of the write head at the ABS. The narrower the second pole tip, the less the track width, and the greater the track density. Both the thickness of the write gap and the narrowness of the second pole tip have received intensive research to improve areal density. The focus of the present invention is to reduce the width of the second pole tip and increase track density, without sacrificing definition of the second pole tip itself.

The second pole tip is typically constructed by frame plating. After forming the first pole piece layer, a write gap layer, and a plurality of insulation layers with a coil layer embedded therein, a photoresist layer is spun on the write gap layer and a top insulation layer. The insulation layers comprise an insulation stack. Unfortunately, the insulation stack contributes to the height of the partially completed write head in a yoke region which is immediately behind a pole tip region. This increases the thickness of the photoresist layer in the pole tip region where the second pole tip is to be formed. Light is directed into the photoresist layer to expose portions that are to be removed by developing for forming the second pole piece in the yoke and pole tip regions. The light scatters to an increasing degree with increasing depth of the photoresist layer. Because of the greater depth of the photoresist layer in the pole tip region, light scattering toward the bottom of the resist can pose a problem when the exposed photoresist is developed for removal. After removal, the photoresist in the pole tip region has side walls that slope inwardly instead of being vertical. This inward slope of the side walls diminishes the definition of the second pole tip. A more serious problem is that the insulation stack has a front sloping light reflecting surface that faces the pole tip region. Light is irregularly reflected from this surface into the pole tip region. Upon developing the photoresist, the side walls of the photoresist in the pole tip region are irregular instead of being planar. The result is a poorly shaped photoresist frame in the pole tip region for forming the second pole tip. The next steps are to plate the second pole piece layer in the opening of the photoresist frame and remove the frame in a dissolvent. The poor shape of the photoresist frames causes the side walls of the second pole tip to be irregular and slanted.

In order to overcome the aforementioned problems of frame plating the second pole tip, the thickness of the photoresist in the pole tip region is kept to an acceptable level. This level is determined by the ratio of the thickness of the photoresist in the pole tip region to the track width of the second pole tip, which is known in the art as the "aspect ratio". An acceptable value for the aspect ratio is four, which implies that the thickness of the photoresist in the pole tip region should be no more than four times the track width of the second pole tip. It can be seen that this can be a serious limitation in constructing a narrow second pole tip. To construct a second pole tip with a 1 $\mu$m track width, the photoresist can be no more than 4 $\mu$m high in the pole tip region. This is very difficult to achieve in view of the height of the insulation stack. Thus, there is a strong-felt need to construct a well-defined second pole tip with a submicron track width.

SUMMARY OF THE INVENTION

The present invention employs frame plating to construct a narrow second pole tip, but adds several steps to ensure that the second pole tip has good definition with minimal process variation. The resist frame is employed to construct a preliminary second pole tip that has preliminary first and second side walls. The spacing between the preliminary side walls is a preliminary width of the second pole tip and is wider than a final track width designed for the final second pole tip. With this arrangement the width of the preliminary second pole tip can be oversized so that the aforementioned aspect ratio can be kept below three. This will ensure well-defined preliminary side walls because wider pole images have less influence from light scattering and diffraction. After removal of the photoresist frame, the preliminary side walls are trimmed by ion milling until they are spaced apart by the final track width, thereby forming the final second pole tip.

This scheme will work provided the height of the preliminary second pole tip is not trimmed by the ion milling. The height of the preliminary second pole tip is the desired height for the final second pole tip and must not be altered during fabrication. If the height is reduced, the amount of second pole tip material in the pole tip region is lessened, causing the second pole tip to magnetically saturate more quickly. This could cause a serious deviation from the specifications for channel electronics for the write head. This problem is avoided by frame plating a non-magnetic, electrically conductive sacrificial layer on top of the preliminary second pole tip before removal of the photoresist frame. The photoresist frame is then removed and ion beam milling is commenced to trim the preliminary width to the final width. This also mills away a portion of the sacrificial layer. In order to ensure that the height of the preliminary second pole tip is not trimmed by the ion milling, the sacrificial layer is purposely made thick enough to leave a portion of the sacrificial layer on top of the final second pole tip, after its completion. The duration of the step of milling the preliminary side walls is the final track width minus the preliminary width, divided by the effective milling rate. The effective milling rate is the milling rate of the particular surface being milled. The sacrificial layer is then made thicker than the duration times the milling rate of the sacrificial layer. The final second pole tip is unique in that it has a partial thickness of the original sacrificial layer in its structure that is electrically conductive, but non-magnetic so that it will not affect the magnetics of the final second pole tip.

An object of the present invention is to provide a method for making a well-defined second pole tip that has a narrow track width with minimal process variation.

Another object is to provide a method of making a second pole tip that has a target height, a submicron track width, and well-defined side walls.

A further object is to provide a method of ion milling a preliminary second pole tip, oversized in width, to a final track width without reducing the height or magnetics of the final second pole tip.

Still another object is to provide a method of trimming a frame plated second pole tip to a designed track width without reducing a height or magnetics of the second pole tip.

Still a further object is to provide a write head with a novel second pole tip that meets track width and height requirements.

Other objects of the present invention will become more apparent upon reading the following description taken together with the accompanying drawings.

DESCRIPTION OF THE PREFERRED EMBODIMENTS

Figure 1:
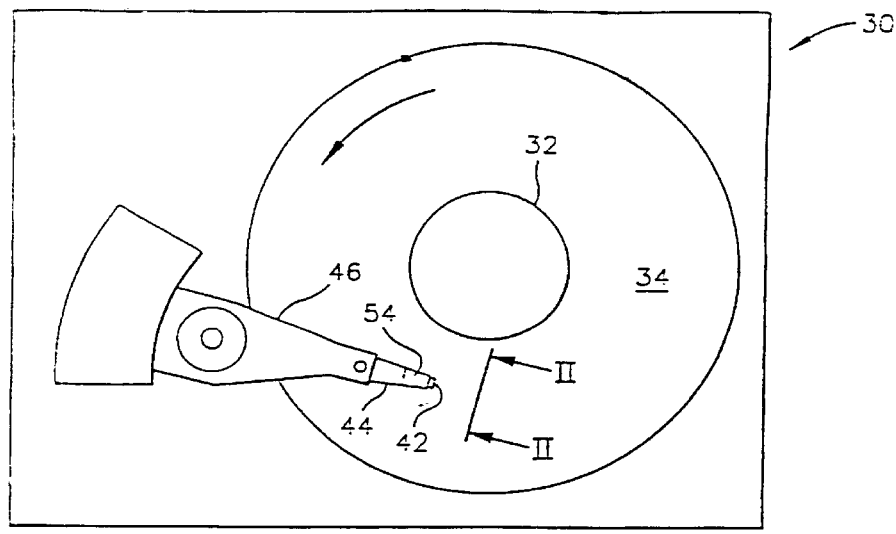
FIG. 1 is a planar view of an exemplary magnetic disk drive.
Figure 2:
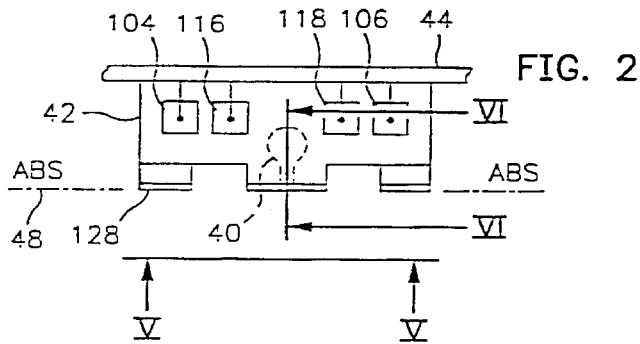
FIG. 2 is an end view of a slider with a magnetic head of the disk drive as seen in plane II—II.
Figure 3:
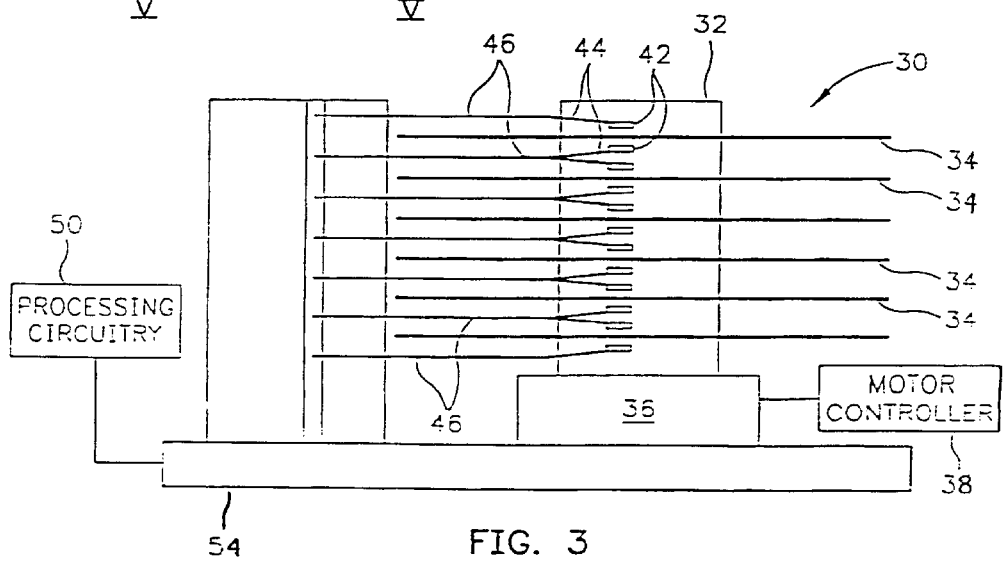
FIG. 3 is an elevation view of the magnetic disk drive wherein multiple disks and magnetic heads are employed.
Figure 4:
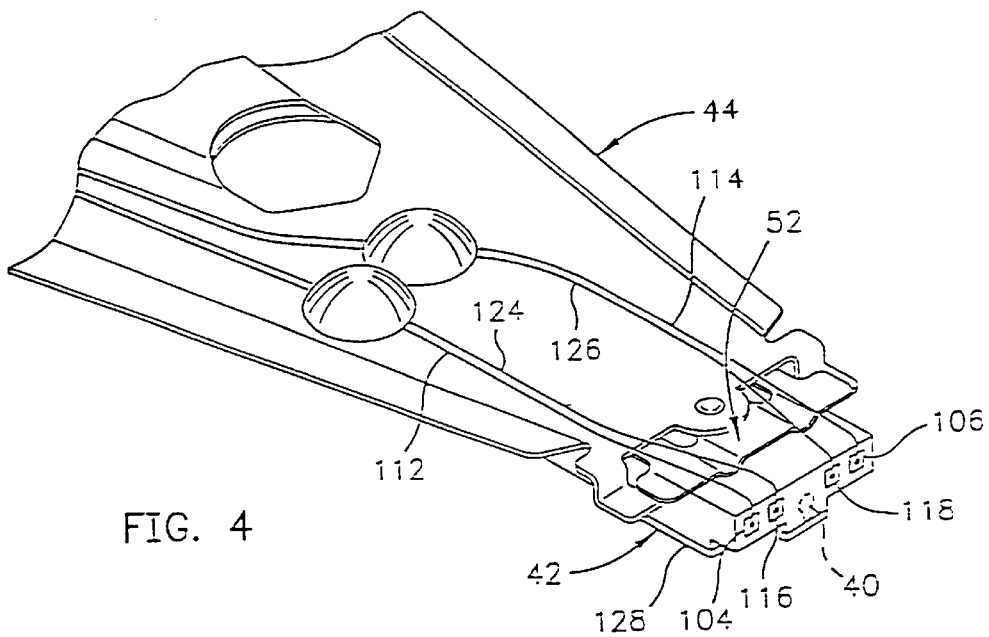
FIG. 4 is an isometric illustration of an exemplary suspension system for supporting the slider and magnetic head.

Referring now to the drawings wherein like reference numerals designate like or similar parts throughout the several views there is illustrated in FIGS. 1–3 a magnetic disk drive 30. The drive 30 includes a spindle 32 that supports and rotates a magnetic disk 34. The spindle 32 is rotated by a motor 36 that is controlled by a motor controller 38. A combined magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 to position the magnetic head 40 in a transducing relationship with a surface of the magnetic disk 34. When the disk 34 is rotated by the motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals, and also provides control signals for moving the slider to various tracks. In FIG. 4 the slider 42 is shown mounted to a head gimbal assembly (HGA) 52 which, in turn, is mounted to the suspension 44. The components described hereinabove may be mounted on a frame 54, as shown in FIG. 3.

Figure 5:
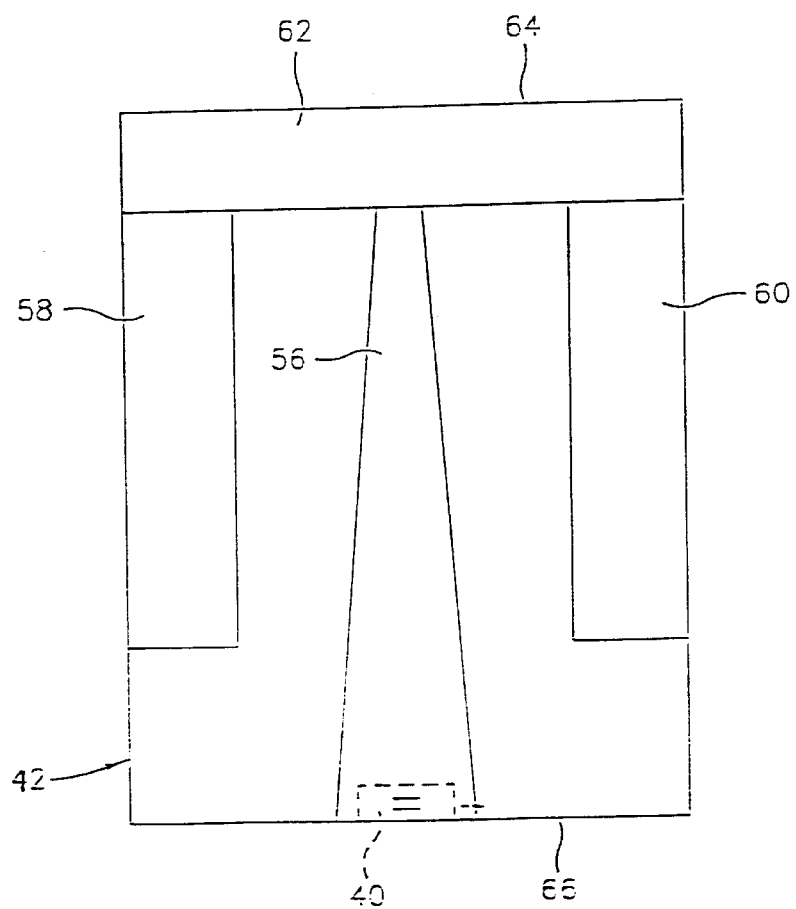
FIG. 5 is an ABS view of the slider and magnetic head taken along plane V—V of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
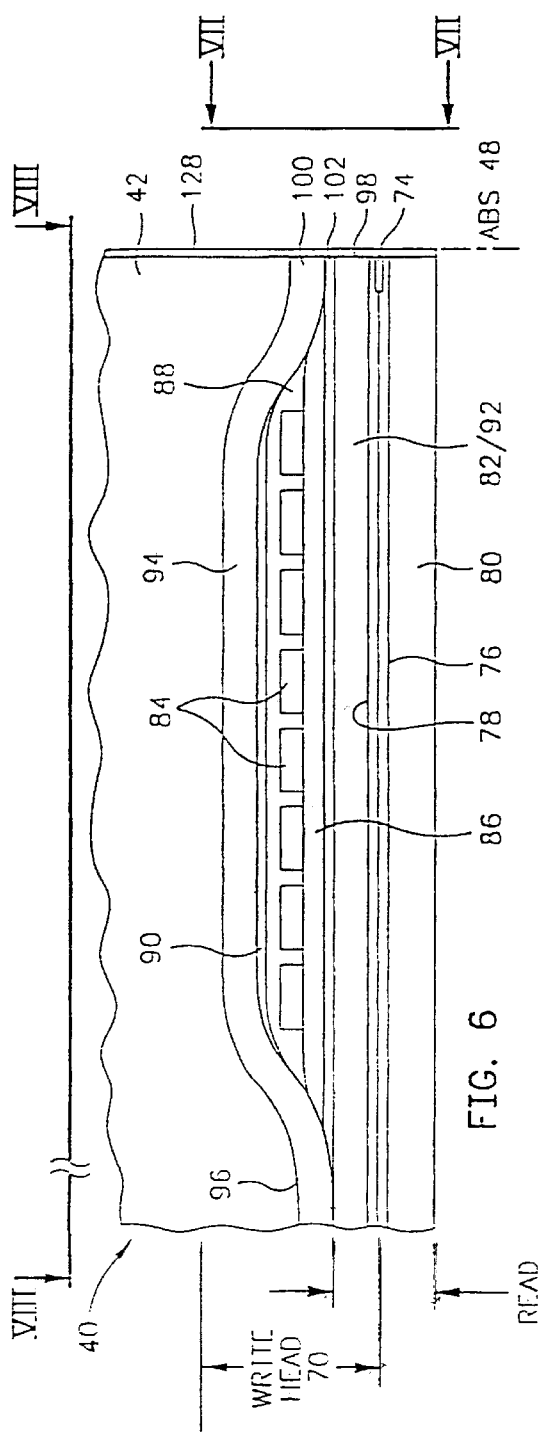
FIG. 6 is a partial view of the slider and magnetic head as seen in plane VI—VI of FIG. 2.
Figure 7:
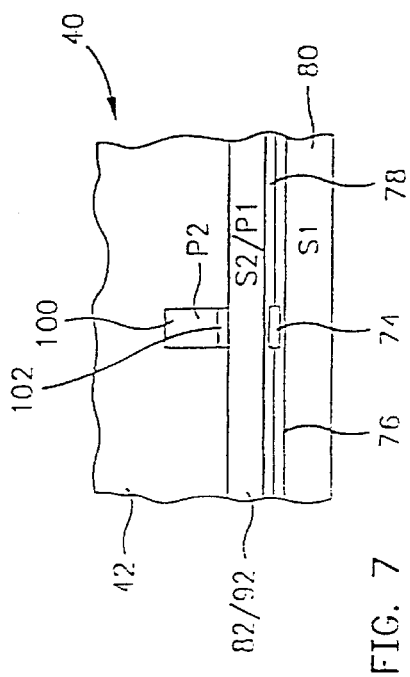
FIG. 7 is a partial ABS view of the slider taken along plane VII—VII with the overcoat layer removed to show the read and write elements of the magnetic head.

FIG. 6 is a side cross-sectional elevation view of the merged MR head 40 which has a write head portion 70 and a read head portion 72, the read head portion employing an MR sensor 74. FIG. 7 is an ABS view of FIG. 6. The MR sensor 74 is sandwiched between first and second gap layers 76 and 78 and the gap layers are sandwiched between first and second shield layers 80 and 82. In response to external magnetic fields, the resistance of the MR sensor 74 changes. A sense current $I_S$ conducted through the sensor causes these resistance changes to be manifested as potential changes. These potential changes are then processed as readback signals by the processing circuitry 50 shown in FIG. 3.

The write head portion of the merged MR head includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads (not shown) from the MR sensor 74 to leads 112 and 114 on the suspension 44 and third and fourth solder connections 116 and 118 connect leads 120 and 122 from the coil 84 (see FIG. 8) to leads 124 and 126 on the suspension. A wear layer 128 may be employed for protecting the sensitive elements of the magnetic head, as shown in FIGS. 2, 4, 6 and 7.

Figure 9:
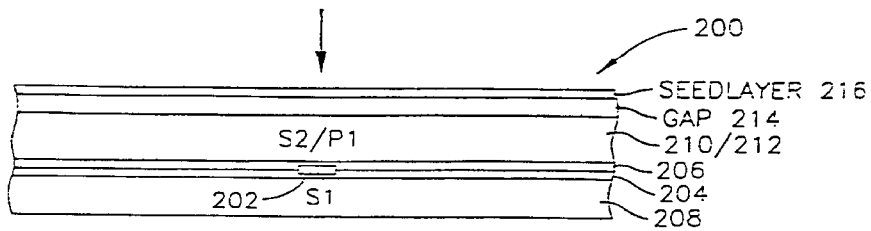
FIG. 9 is a prior art ABS view of a partially completed merged MR head showing a step of depositing a write gap layer and a seed layer.
Figure 10:
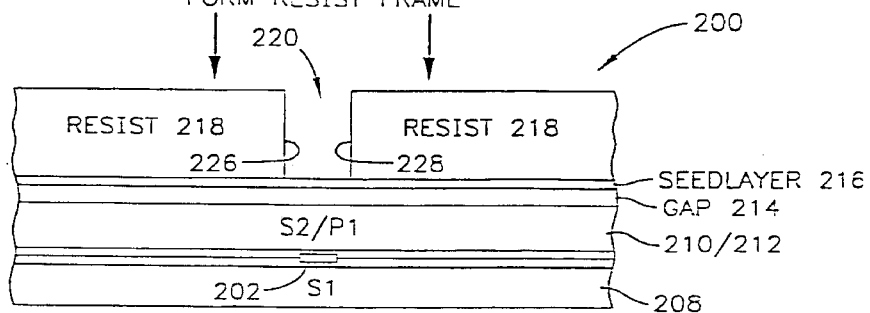
FIG. 10 is the same as FIG. 9 except a photoresist frame has been formed on the seed layer with an opening for the construction of a second pole piece.
Figure 11:
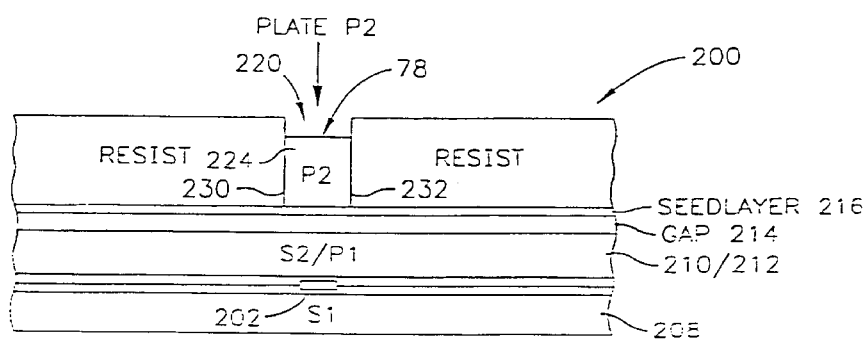
FIG. 11 is the same as FIG. 10 except the second pole piece has been plated on the seed layer within the opening in the photoresist frame.

FIGS. 9–11 illustrate a prior art method for constructing a second pole piece along with its second pole tip. FIG. 9 illustrates a prior art partially completed merged MR head 200, which includes an MR sensor 202 sandwiched between first and second gap layers 204 and 206. The first and second gap layers 204 and 206 are sandwiched between first and second shield layers 208 and 210. The read head portion of the merged MR head comprises the MR sensor 202 and the layers 204, 206, 208 and 210. In the merged MR head the second shield layer 210 is a common layer with a first pole piece layer 212 of the write head portion of the merged MR head. FIG. 9 also shows the steps of depositing a write gap layer 214 on the first pole piece layer 212 and depositing by sputter deposition a seed layer 216 on the gap layer and the first pole piece layer 212.

Figure 8:
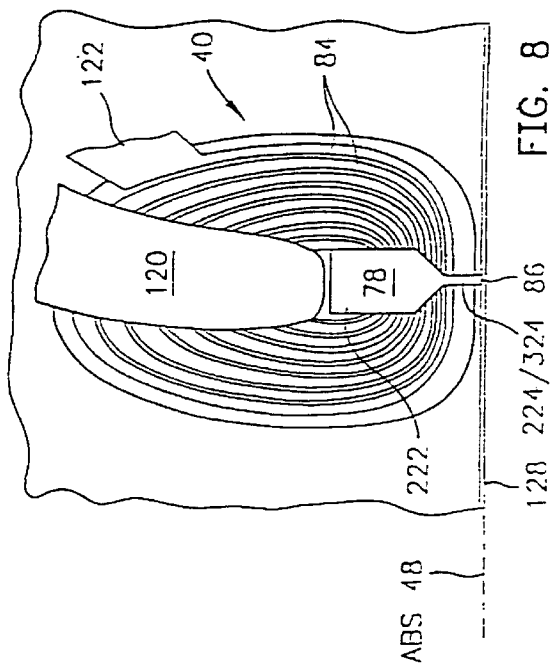
FIG. 8 is a view taken along plane VIII—VIII of FIG. 6 with all material above the second pole piece removed and with a portion of the head back of the back gap shown to illustrate the complete coil.

As shown in FIG. 10, a photoresist frame 218 is next formed on the seed layer with an opening 220, the opening 220 having the same configuration as the periphery of the second pole piece layer 78 shown in FIG. 8. FIG. 8 shows the second pole piece layer 76 as having a yoke portion 222 and a pole tip portion 224. In order for the side walls 226 and 228 of the resist frame 218 in FIG. 10 to have good definition, namely planar, parallel with respect to one another and perpendicular to the plane of the first pole piece layer 212, the aforementioned aspect ratio should be less than four. This is desirable for constructing a second pole tip 224. As discussed hereinabove, when the aspect ratio exceeds four, the side walls are not well-defined which degrades the second pole tip.

Figure 12:
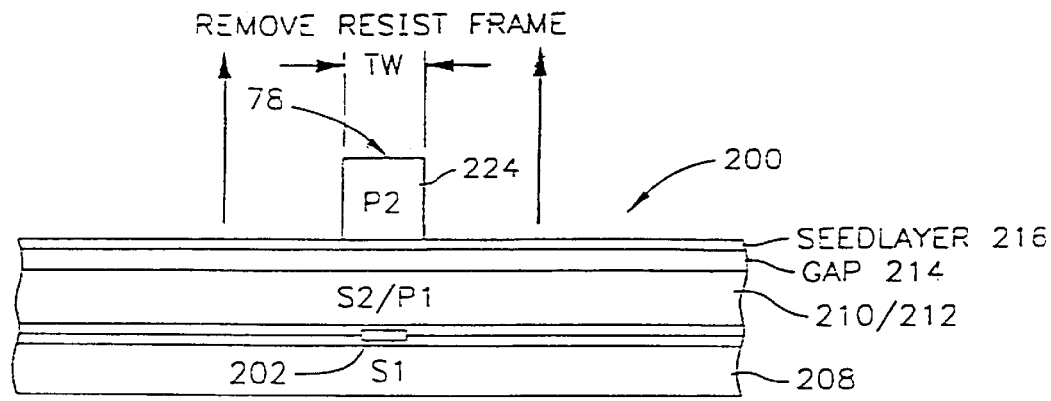
FIG. 12 is the same as FIG. 11 except the photoresist frame has been removed leaving the completed second pole piece with its second pole tip.

In FIG. 11 the second pole piece 78, shown in FIG. 7, is plated on the seed layer 216 within the opening 220. This results in a second pole tip 224, which has first and second side walls 230 and 232, as shown in FIG. 11. The next step is shown in FIG. 12 wherein the photoresist frame is removed leaving the final second pole piece 78 with its second pole tip 224. The narrowness of the track width (TW) of the second pole tip 224 is limited by the aforementioned aspect ratio. It is difficult to keep the thickness of the photoresist frame in the pole tip region sufficiently thin to construct a second pole tip with a submicron track width. Further, the side walls 230 and 232 are typically irregular due to irregular side walls 226 and 228 of the resist frame caused by irregular light reflections from the insulation stack. Accordingly, the aforementioned prior art frame plating process for forming the second pole tip is not practical for constructing a well-defined second pole tip with a submicron track width.

Figure 13:
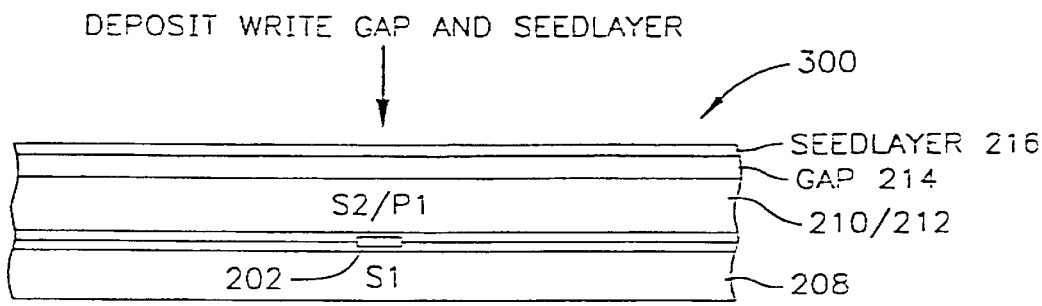
FIG. 13 is an ABS view of the present partially completed merged MR head showing a step of depositing a write gap layer and a seed layer.
Figure 14:
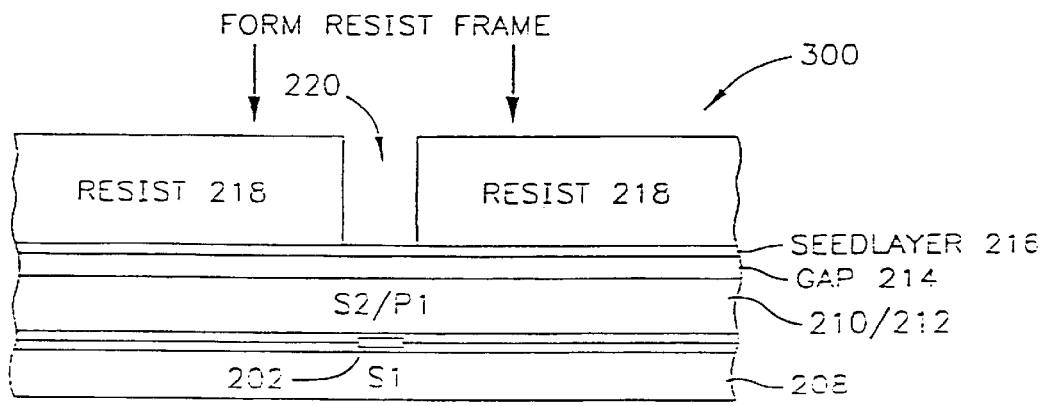
FIG. 14 is the same as FIG. 13 except a photoresist frame has been formed with an opening for plating a second pole piece layer.
Figure 15:
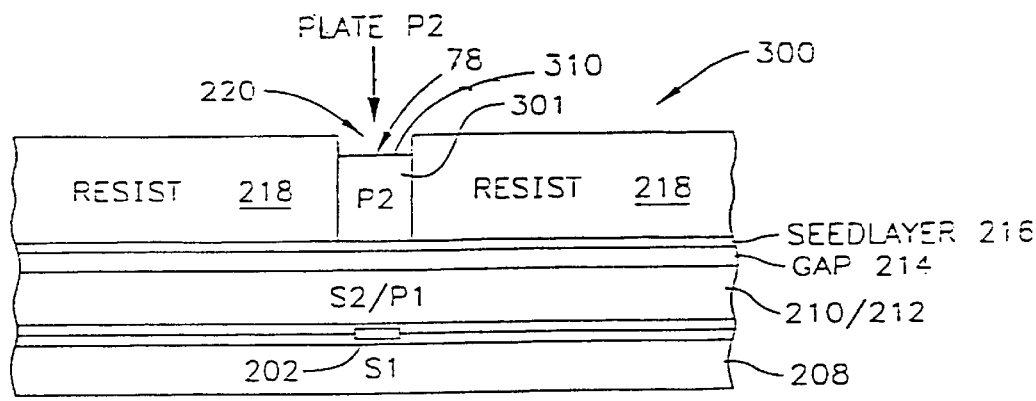
FIG. 15 is the same as FIG. 14 except the second pole piece has been plated with the second pole tip thereof.

FIGS. 13–19 show the steps of the present method for making a reliably accurate submicron second pole tip with well-defined side walls. The first three steps of the present method shown in FIGS. 13, 14 and 15 may be the same as the prior art steps shown in FIGS. 9, 10 and 11, respectively. In FIG. 13 the same gap layer 214 and the same seed layer 216 may be deposited on the first pole piece layer 212 of a partially completed merged MR head 300. In FIG. 14 the same photoresist frame 218 may be deposited on the seed layer 216. In FIG. 15 the second pole piece 78, shown in FIG. 8, is plated on the seed layer within the opening 220 of the resist frame resulting in a preliminary second pole tip 301. The preliminary second tip 301, for example, is the same as the second pole tip 224 in FIG. 11, but is called out and numbered differently because of the significant difference in the way a final second pole tip is constructed in the following steps.

Figure 16:
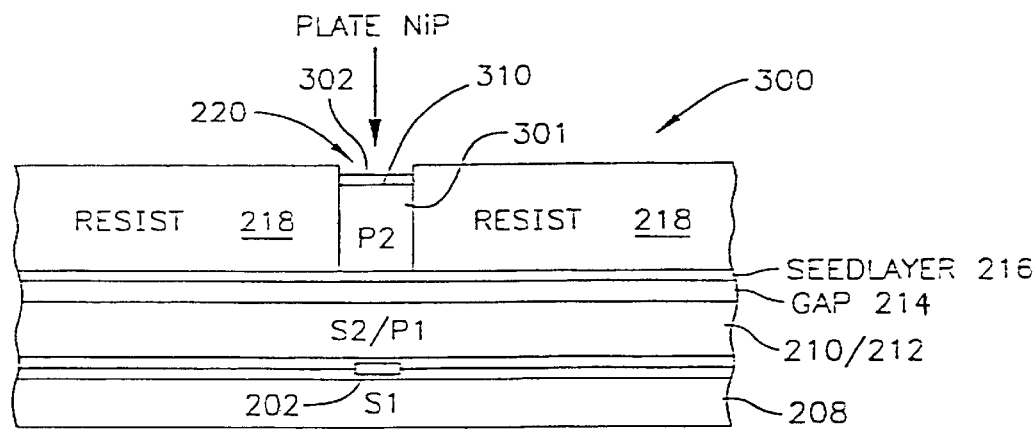
FIG. 16 is the same as FIG. 15 except a non-magnetic electrically conductive sacrificial layer has been plated on top of the second pole tip.
Figure 17:
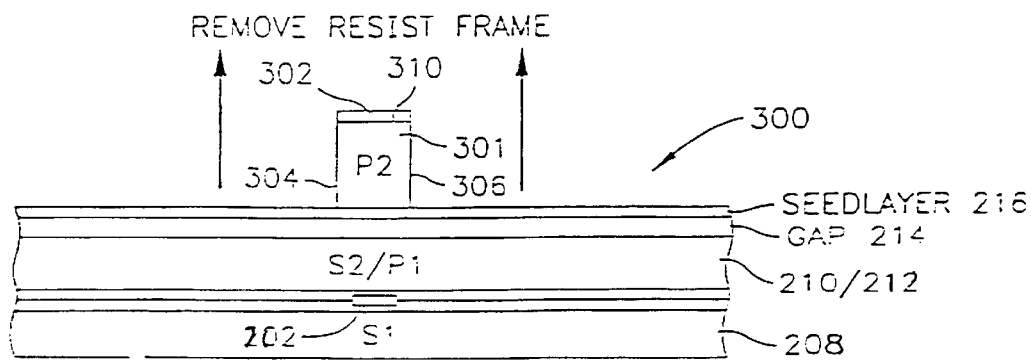
FIG. 17 is the same as FIG. 16 except the photoresist frame has been removed leaving a preliminary second pole tip.

In FIG. 16 a non-magnetic electrically conductive sacrificial layer 302 is plated on top of the second pole piece 78 in FIG. 8 employing the same photoresist frame 218 for its pattern. Accordingly, the sacrificial layer 302 may overlie the entirety of the second pole piece 78, shown in FIG. 8, as well as the second pole tip portion 301. The next step is to remove the resist frame 218, as shown in FIG. 17, leaving the preliminary second pole tip 301 with the sacrificial layer 302 on top thereof. As shown in FIG. 17, the preliminary second pole tip 301 has preliminary first and second walls 304 and 306. These side walls are well-defined since the aspect ratio shown in FIG. 16 has been kept at four or less.

Figure 18:
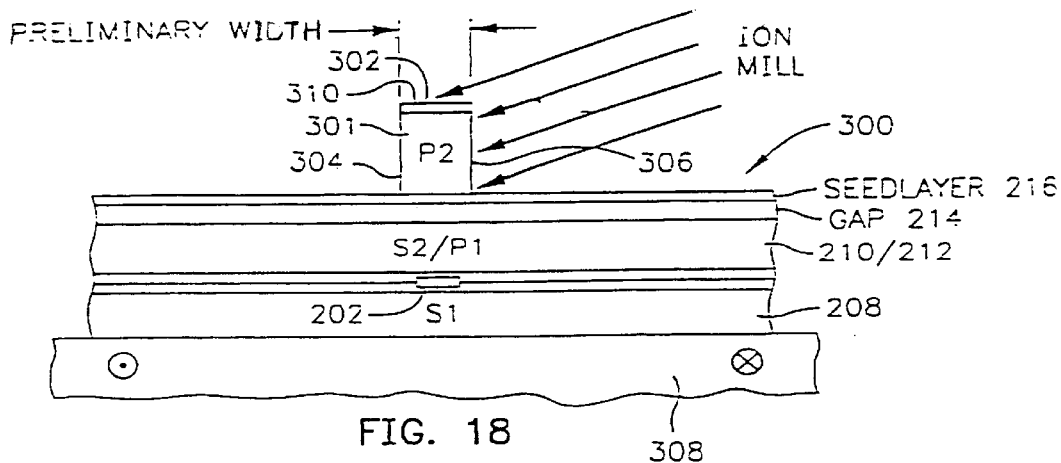
FIG. 18 is the same as FIG. 17 except the second pole tip is being trimmed by ion milling.

The next step is to trim the preliminary side walls 304 and 306 by ion milling, as shown in FIG. 18. This ion milling will etch away the side walls to reduce the width of the preliminary second pole tip 301. It should be noted that the sacrificial layer 302 will also be etched because of the ion milling. In a preferred method of the invention, the orientation of the ion milling is directed at an angle from 65° to 85° to the surface of the preliminary side wall 304 or the preliminary side wall 306. The angle shown in FIG. 18 is approximately 75°. At these angles the etching of the preliminary side walls 304 and 306 will be optimized relative to the etching of the sacrificial layer 302.

In a typical ion milling step the partially completed merged MR head 300 is rotated on a wafer 308, as shown by the incoming and outgoing arrow notations thereon. In this manner, the ion milling trims the preliminary side wall 306 for a portion of the cycle, as shown in FIG. 18, and, upon continuing rotation, the ion milling will trim the preliminary side wall 304 and so on. Alternatively, the wafer 308 may be oscillated back and forth to completely trim one of the preliminary side walls and then rotated 180° and oscillated back and forth to completely trim the other preliminary side wall. It should be noted that the top 310 of the preliminary second pole tip 301 has been established by the frame plating step in FIG. 15. This height is to be maintained in the final second pole tip so that designed magnetics of the second pole are obtained.

Figure 19:
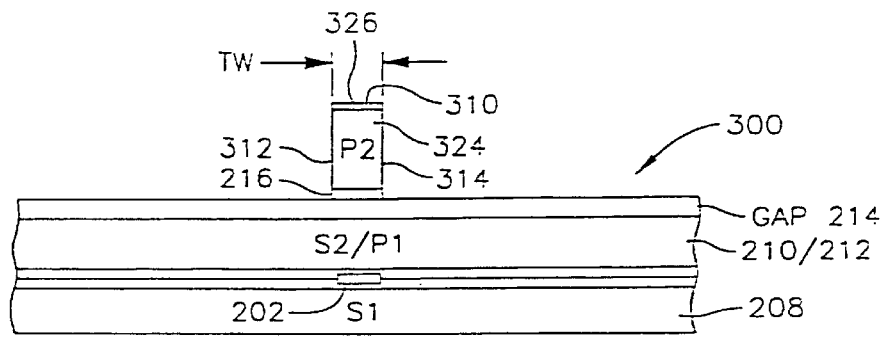
FIG. 19 is the same as FIG. 18 except the ion milling step has been completed and a final second pole tip with a final track width has been formed.

The ion milling is continued until the preliminary side walls 304 and 306 are milled to produce final side walls 312 and 314, as shown in FIG. 19. The final side walls 312 and 314 produce the final pole tip 324 with a final top 310. The final side walls 312 and 314 are spaced from each other by the final track width (TW). It should be noted that the final track width of the final second pole tip 324 in FIG. 19 is considerably narrower than the second pole tip 224 produced by the prior art method in FIG. 12.

Figure 20:
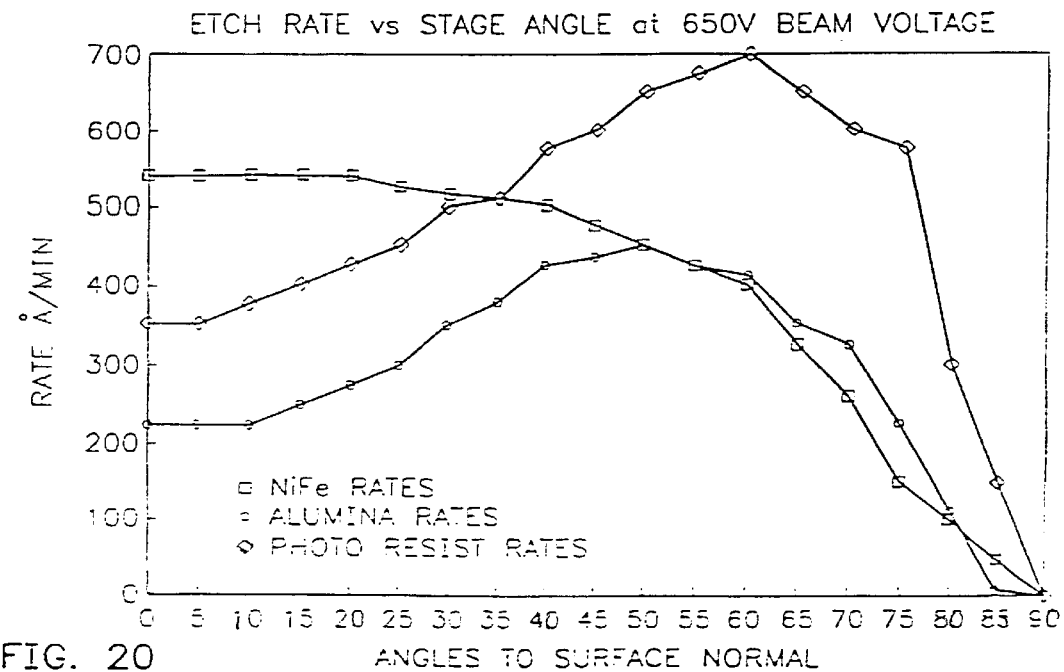
FIG. 20 is a graph illustrating etch rates of various materials, depending upon the angle of the ion milling to a normal to the surface being milled.

The duration of the ion milling will be equal to the difference between the width of the preliminary pole tip 301, shown in FIG. 18, minus the track width of the final second pole tip 324, shown in FIG. 19, divided by the effective ion milling rate. This, of course, depends upon the material being milled, the angle of the ion milling, the strength of the ion beam and the topology on the wafer. FIG. 20 shows the milling rates of various materials and, in particular, NiFe shown by the open squares at different angles to a normal to the surface of the NiFe being milled with a beam strength of 650 volts. It can be seen that, as the angle to the surface normal decreases, the etch rate of the surface increases. Angles to the surface that is being milled would be a complement of the angles shown in FIG. 20. The graph also shows the etch rates for alumina and photoresist. The effective milling rate is the milling rate of the particular surface being milled taking into account the aforementioned factors.

It is important that the sacrificial layer 302, shown in FIG. 18, not be completely consumed upon completion of the final second pole tip 324, shown in FIG. 19. Accordingly, a partial sacrificial layer 326 remains, as shown in FIG. 19. This is important to protect the top 310 of the second pole tip from being etched by the ion milling step shown in FIG. 18. Accordingly, the thickness of the sacrificial layer 302, shown in FIG. 18, should be thicker than the etch rate of the material employed for the sacrificial layer times the duration to complete milling of the second pole tip. The material for the sacrificial layer is electrically conductive so that it can be plated in the step shown in FIG. 16, and yet should be non-magnetic so that it does not affect the magnetics of the second pole tip. A preferred material for the sacrificial layer is NiP. Other possible materials are chrome and copper. Optionally, the partial sacrificial layer 326 may be removed after the etching step by any suitable means, such as by a dissolvent.

It should be understood that a plurality of magnetic heads are typically constructed on a wafer such as the wafer 308 shown in FIG. 18. These heads are constructed in rows and columns and may be numbered literally in the thousands. After completion of construction of the preliminary pole tip 301, shown in FIG. 17, the widths of the magnetic heads on a single wafer and/or on different wafers may be different due to process variations. It is desirable to measure the width of at least one of the preliminary second pole tips 301 on a wafer before the duration of milling is calculated. It is preferable, however, to measure widths of a plurality of preliminary pole tips 301 on a wafer and average the measured widths to come up with an average width for the calculation of the duration of the ion milling. This approach will increase the yield of manufacturing to produce second pole tips which are within tightly designed parameters. The preferred method is to employ NiP as the sacrificial layer and make it 0.2 µm to 1.0 µm thick, make the width of the preliminary second pole tip 0.5 µm to 1.0 µm wider than the final track width and employ an angle of 65° to 85° to the surface of the preliminary side wall to be milled or 25° to 15° to a normal to the surface of the preliminary side wall, as shown in FIG. 20.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A method of making a write head, the write head having an air bearing surface (ABS), a pole tip region commencing at the ABS, a back gap region and a yoke region between the pole tip region and the back gap region, a final second pole tip in the pole tip region that has a final height at the ABS and a final track width at the ABS, the final track width being substantially perpendicular to a direction of media movement, the method comprising:

forming a first pole piece layer of ferromagnetic material in the pole tip region, yoke region and back gap region;

forming a non-magnetic write gap layer on the first pole piece layer at least in the pole tip region;

forming a mask on the write gap layer that has an opening with first and second side walls, the side walls being located in the pole tip region and being separated by a width at the ABS that is substantially perpendicular to said direction of media movement;

said width being wider than said final track width;

forming ferromagnetic material on said write gap within said opening to form a preliminary second pole tip, the preliminary second pole tip having preliminary first and second side walls that are formed by the first and second side walls of the mask, the preliminary first and second side walls being located in the pole tip region and having a preliminary width and said final height at the ABS, the preliminary width being greater than said final track width;

forming a non-magnetic electrically conductive sacrificial layer on said preliminary second pole tip within said opening;

removing the mask; and ion milling said preliminary first and second side walls at a predetermined angle relative to surfaces of the preliminary first and second side walls;

said predetermined angle being sufficient for the ion milling to reduce said preliminary width to said final track width without completely removing said sacrificial layer;

said ion milling having a duration, said duration being determined by:
  determining a difference between a plurality of preliminary widths and a final width; and,
  dividing the difference by a milling rate of the material of the preliminary second pole tip.

2. A method as claimed in claim 1, including:
said mask being a photoresist frame.

3. A method as claimed in claim 1, including:
said preliminary side walls being substantially parallel with respect to one another and perpendicular to the ABS.

4. A method as claimed in claim 1, including:
said preliminary width being 0.5 to 1.0 μm wider than said final track width.

5. A method as claimed in claim 1, including:
the sacrificial layer having a thickness in the range of 0.2 μm to 1.0 μm.

6. A method as claimed in claim 1, including:
the ferromagnetic material of the preliminary second pole tip being NiFe and the sacrificial layer being NiP.

7. A method as claimed in claim 1, including:
said predetermined angle being from 65 to 85 degrees.

8. A method as claimed in claim 7, including:
said mask being a photoresist frame.

9. A method as claimed in claim 8, including:
said preliminary side walls being substantially parallel with respect to one another and perpendicular to the ABS.

10. A method as claimed in claim 9, including:
said preliminary width being 0.5 to 1.0 μm wider than said final track width.

11. A method as claimed in claim 10, including:
the sacrificial layer having a thickness in the range of 0.2 μm to 1.0 μm.

12. A method as claimed in claim 11, including:
the ferromagnetic material of the preliminary second pole tip being NiFe and a material of the sacrificial layer being NiP.

13. A method of making a merged MR head, comprising:

depositing a thin film first shield layer;

depositing a thin film first gap layer on the first shield layer;

depositing a thin film MR sensor and sensor leads on the first gap layer;

depositing a thin film second gap layer on the MR sensor, the sensor leads and the first gap layer;

depositing a thin film second shield/first pole piece layer on the second gap layer;

depositing in unordered steps a thin film write gap layer and a first insulation layer on the second shield layer/first pole piece layer;

forming a write coil layer on the first insulation layer;

forming one or more insulation layers on the write coil layer;

forming a preliminary second pole tip on the write gap layer that is bounded in part by a top and preliminary first and second side walls, the preliminary first and second side walls being separated by a preliminary width at the ABS that is wider than a desired final track width at the ABS of final first and second side walls of a final second pole tip;

forming a non-magnetic sacrificial layer on said top of the preliminary second pole tip;

ion beam milling the preliminary first and second side walls to define said final first and second side walls of said final second pole tip with at least a portion of said sacrificial layer remaining on said top of said final second pole tip;

said ion milling having a duration, said duration being determined by:
  determining a difference between a plurality of preliminary widths and a final width; and,
  dividing the difference by a milling rate of the material of the preliminary second pole tip.

14. A method as claimed in claim 13, including:
the sacrificial layer being an electrically conductive material formed by plating on top of the preliminary second pole tip.

15. A method as claimed in claim 14, including:
said ion milling having a duration which is equal to the preliminary width minus the final track width divided by a milling rate of a material of the preliminary second pole tip.

16. A method as claimed in claim 15 wherein the preliminary second pole tip and the sacrificial layer are formed by frame plating in a single photoresist frame.

17. A method as claimed in claim 16, including:
each of the preliminary first and second side walls defining a plane; and the ion beam milling being directed at an angle of between 65° to 85° to the planes of the preliminary first and second side walls;

said ion milling having a duration, said duration being determined by:
  determining a difference between a plurality of preliminary widths and a final width; and,
  dividing the difference by a milling rate of the material of the preliminary second pole tip.

* * * * *